May 1, 1962 R. K. WILLIAMS ETAL 3,032,353
TELESCOPIC TOW BAR FOR BOAT TRAILERS
Filed Jan. 5, 1959 2 Sheets-Sheet 1

ROBERT K. WILLIAMS
J. EUGENE BLAIR
INVENTORS

BY *Albert G. Fike*

ATTORNEY

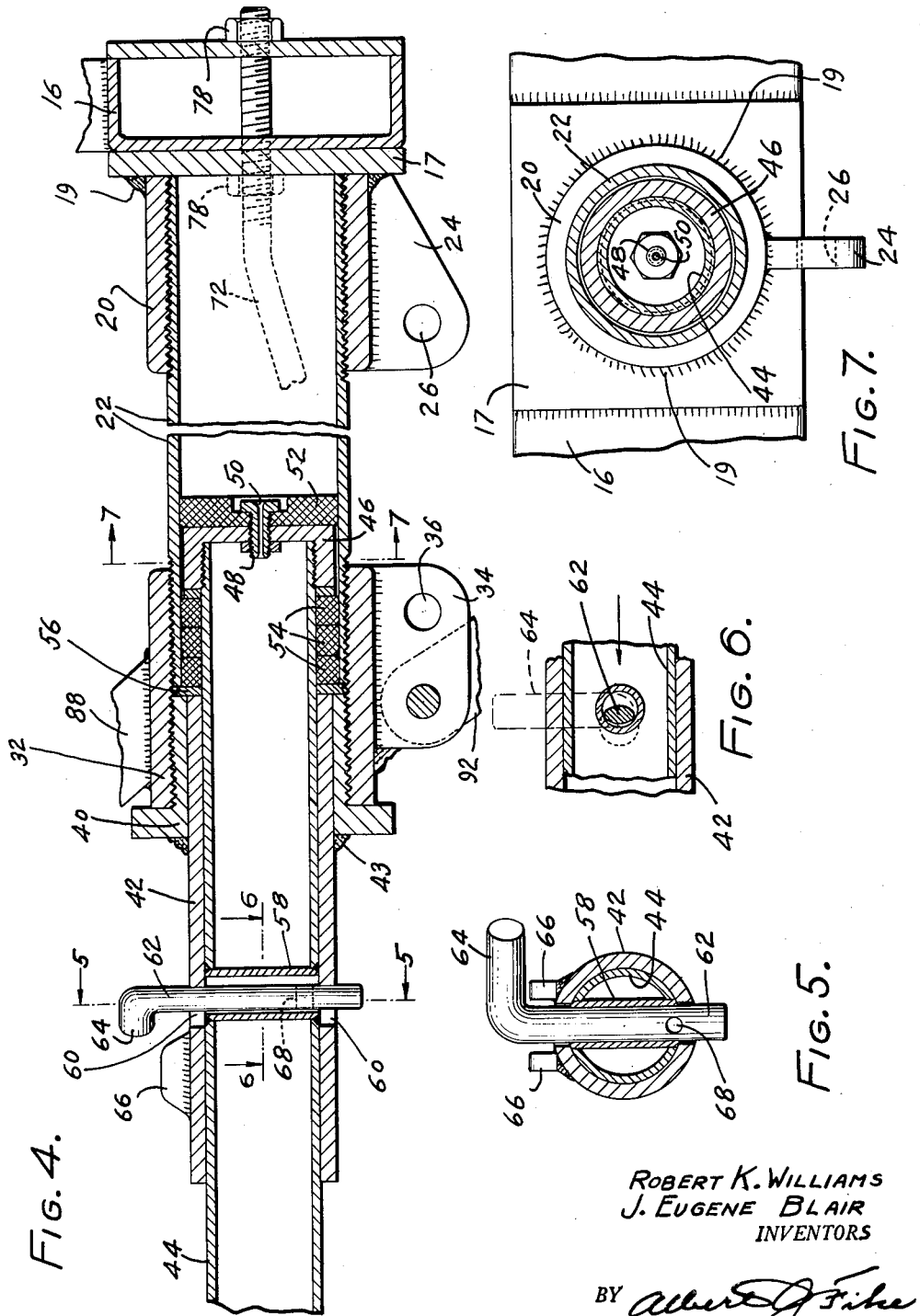

United States Patent Office 3,032,353
Patented May 1, 1962

3,032,353
TELESCOPIC TOW BAR FOR BOAT TRAILERS
Robert K. Williams, 661 Country Club Drive, Burbank, Calif., and James Eugene Blair, P.O. Box 1128, Glendale, Calif.
Filed Jan. 5, 1959, Ser. No. 785,015
3 Claims. (Cl. 280—414)

This invention relates to an improved telescopic tow and launching bar for boat trailers and has for one of its principal objects the provision of a device of the class described, which will enable simple and easy, the operation of hauling a boat and launching the same from a trailer, such as those ordinarily used in this connection, by being towed with an automobile or similar vehicle.

Another object of this invention is to provide a boat trailer, whereby launching of the boat can usually be effected by simply backing the trailer over a beach, close to the water, while it is still attached to the towing vehicle and then adjustably and controllably lengthening the tow bar.

Another important object of the invention is to provide a boat trailer and telescopic tow bar which includes guides for use in hauling the boat out of the water when such is desired, and wherein the tow and launching bar, while telescopic, is so constructed as to prevent jackknifing.

Another and further important object is to provide a telescopic member for connecting the boat trailer to the towing vehicle, whereby the boat, while being towed, will always be a reasonably safe distance behind the vehicle, while, at the same time, the tow bar can be extended for boat launching and recovery purposes.

Yet another object is the provision of such an article which will embrace desired features of simplicity, durability and economical manufacturing, in that it is composed of relatively few parts and assembled in such a manner as to be substantially foolproof.

Still another and further important object of this invention is to provide an improved telescopic tow bar for a boat trailer which will comprise a plurality of interconnected tubular sections held in telescoped relationship when the boat is being transported over land on the trailer, but which tow bar can be extended, when the trailer, with a boat supported on it, is being moved to the water for launching the boat, and which can be retained in such extended position for ease in removing the boat from the water, after which it is again telescoped for hauling purposes.

A further object of the invention is to provide a telescopic tow and launching bar for boat trailers which can be easily incorporated into trailers already in use with little or no difficulty.

Another and still further important object of the invention is the provision of a structure of the type above described, which can be made readily adjustable to accommodate boats of different lengths within reasonable proportions.

Other and further important objects of the invention will be apparent from the disclosures in the accompanying drawings and following specification.

The invention, in a preferred form, is illustrated in the drawings and hereinafter more fully described.

In the drawings:

FIGURE 4 is an enlarged view, partly in section and parts broken away, taken on the plane of the line 4—4 of FIGURE 3, looking in the direction indicated by the arrows.

FIGURE 5 is a vertical section on the line 5—5 of FIGURE 4, looking in the direction indicated.

FIGURE 6 is a detail section on the line 6—6 of FIGURE 4.

FIGURE 7 is a section on the line 7—7 of FIGURE 4, parts being broken away.

As shown in the drawings:

Figure 1:
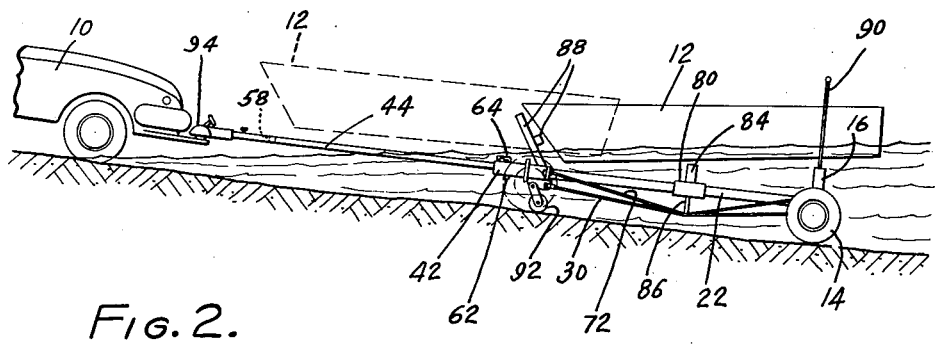
FIGURE 1 is an elevational view, illustrating the improved telescopic tow bar and boat trailer of this invention, showing the actual method of operation.

The reference numeral 10 indicates generally any type of towing vehicle to which can be attached the telescopic tow and launching bar and boat trailer of this invention. A representative type of boat is depicted at 12.

Figure 2:
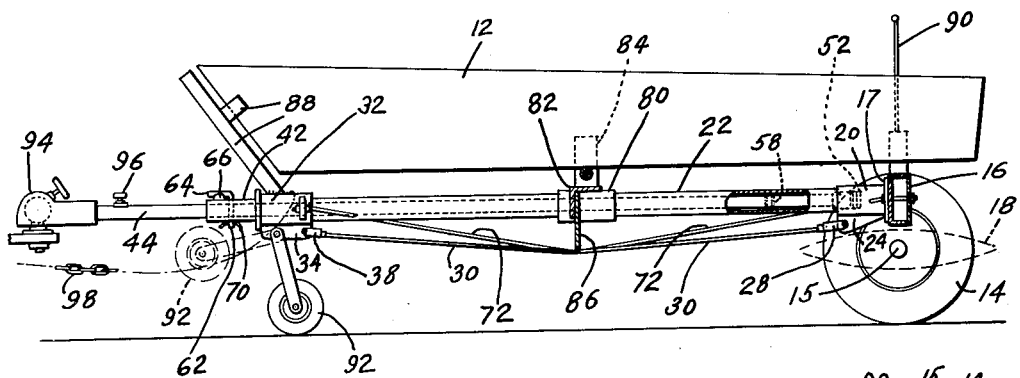
FIGURE 2 is an enlarged view of the trailer and boat and illustrating more details.

The trailer itself includes a pair of rear wheels 14 on an axle 15, supporting a cross frame element 16, which is preferably tubular and rectangular in cross section, as best shown in FIGURES 2 and 4. Springs 18 may be employed, if desired, and these can be of any type.

Fastened to the cross frame 16 by welding or removable bolts is a cylindrical support 20, interiorly screw-threaded for the reception of a tubular element 22 (FIGURE 4), and the cylinder 20 is provided with a downwardly extending stud 24, having an opening 26 therein to receive a clevis 28 on the end of a tie-bar 30 (FIGURE 2).

The tube 22 extends forwardly to a length approximately that of the average boat of this type and terminates in a cylindrical element 32, similar to the element 20, and which also has a stud 34, having an opening 36 therein, which receives a clevis 38 at the forward end of the tie-bar 30.

A flanged cylinder 40 is screw-threadedly mounted in the forward end of the cylindrical element 32 (FIGURE 4), and this receives a tube or sleeve 42, extending forwardly to any predetermined length, depending on circumstances.

The two portions 32 and 40 can be joined to each other and to the end of the tube 22 in various manners, and the tube 42 is preferably retained in position with respect to the flange cylinder 40 by welding or the like, as shown at 43.

Another tubular element 44 of a length slightly greater than the length of the tube 22 is slidably fitted into the sleeve 42 and in such a manner that it can be telescoped for a great part of its length into the tube 22. The rear end of this tube 44 is exteriorly screw-threaded to receive a cylindrical cap 46, which cap is provided with a central opening, having a grommet or the like 48 fitted therein, this grommet having a passageway 50 for air. The passageway may be of various sizes.

A cushioning element 52 is on the end face of the cap 46 and its grommet, and a further group of annular cushioning elements 54 is positioned around the outer face of the inner end of the tube 44, all as best shown in FIGURE 4. Retaining rings 56 maintain the cushioning elements 54 in desired position.

The forward ring 56 (FIGURE 4) is locked in position inside the cylinder 32 and between the forward end of the tube 22 and the rear end of the flanged cylinder 40. The cushioning elements 54 are bonded together and to both of the rings 56. Accordingly a shock absorbing construction is thereby provided and furthermore the seal between the inside of tube 22 and the outside of tube 44 is always operative and is at all times retained inside the cylinder 32.

This cushion and seal combination 54—56 offers very little frictional restraint in so far as the sliding action between the tubes 22 and 44 is concerned. However, at the end of the extending movement the resultant longitudinal compression of the rings 54 exerts an expanding reaction and this is enhanced as the result of the camming action of a locking bar 62—64 in its coaction between the sleeve 58 and the openings 60 in the tube 44.

In this case it will be noted that the sleeve 58 prevents both water and air from entering or leaving the tube 44 at that point and resilient rings 54 exert similar sealing action between the two tubes especially when the tubes are locked in their extended position. This actually effects a sealed air compartment which is always above water and which extends from the towing hitch 94 to the end of the tube 22 at its point above the rear axle housing 16.

When the tube 44 is moved rearwardly into the tube 22, the cushioning element 52 will first come into action by contacting the inner face of the plate 17, which is on the housing 16, and which is usually welded to the cylinder 20, as shown at 19. The cushioning action is further enhanced by the annulii 54, and it will be obvious that a longitudinal compression of these rings along the line of movement of the tube 44 will cause an expansion along lines at right angles to the direction of movement so that, in addition to the desired cushioning action, an additional frictional and snubbing action will result.

The tube 44 has a transversely drilled opening adjacent its inner end, and a sleeve 58 is fixed in this opening, all as best shown in FIGURES 4 and 5, and two corresponding openings 60 are formed in the sleeve or tube 42. These sleeves are in fluid-tight relationship.

The tube 44 can be locked in its outermost position by the insertion of an L-shaped rod 62 into the sleeves 58 when it is alined with the opening 60.

Referring now to FIGURE 6, it will be seen that the rod 62 is elliptical in cross section so that it can be readily fitted into the openings, even though they are not absolutely in alinement. Then the rod 62 can be turned by its handle 64 to aline the openings and, at the same time, the handle can be pushed downwardly into a locked position between a pair of ears 66, which are welded or otherwise affixed to the upper face of the sleeve 42 (FIGURE 5). An opening 68 is provided adjacent the lower end of the rod 62 for the reception of a locking pin 70 or some other suitable locking and rod-retaining means.

It will be evident that the turning action of the rod 62 by its handle 64 in the sleeve and opening 60 (FIGURES 4 and 6) will act to compress the resilient retaining rings 54, thereby providing the desired fluid-tight seal between the inner face of the tube 22 and the slidable tube 44. This also prevents chattering during operation and transportation.

It is a well-known fact that the bearings of the trailer wheels 14 will inevitably become heated when the boat is in transit on the trailer, and when the trailer with the boat is let into the water, the wheel bearings will immediately become chilled, causing them to contract; and this may allow water to enter the bearings, which would eventually damage the same. The usual oil and water seals are, of course, provided; but it will be noted that such undesirable entry of water is prevented by reason of the various sealing elements and the ready access of air to the interior by reason of the passageway 50. A pneumatic cushion also results.

From an inspection of FIGURE 2, it will be noted that the same handle rod locking element 62—64 can be employed to retain the assembled tubes in both telescoped and extended position, because there is an opening and sleeve similar to the sleeve 58 in the forward end of the tube 44. The telescoping sections can be of any shape in addition to circular, and may be more than two, with the same or a similar locking arrangement.

Figure 8:
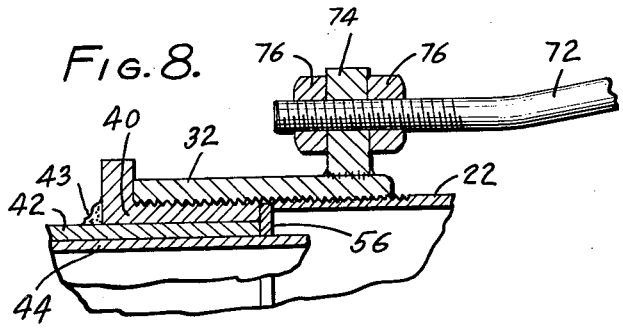
FIGURE 8 is a detail view, partly in section, showing portions of the telescopic frame and tie-bar assembly.

A secondary pair of tie-rods 72 joins the front support 32 to the rear frame element 16, and the forward ends of these tie-bars pass through openings in studs 74 on the sides of the cylinder 32, being held in position by lock nuts or the like 76 (FIGURE 8).

The rear ends of the tie-bars 72 are fitted through openings in the hollow cross frame 16 and also held in desired position by adjustable locking nuts 78.

Figure 3:
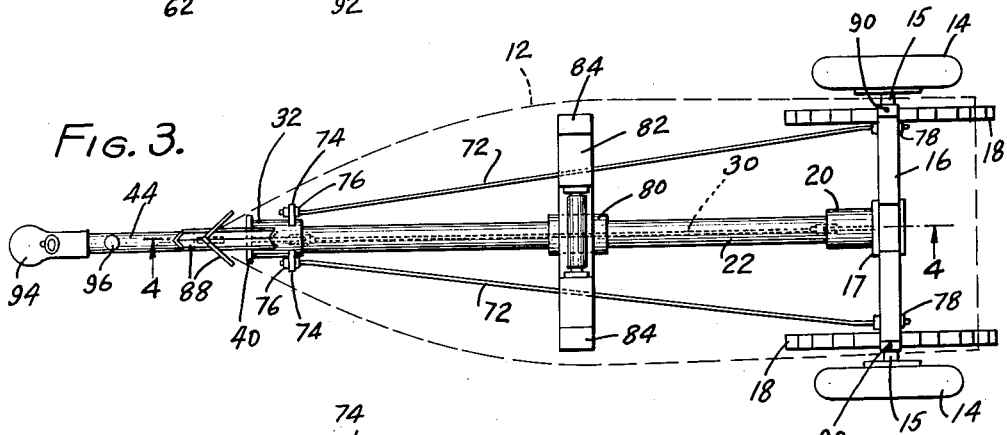
FIGURE 3 is a top plan view of the trailer and tow bar combination, illustrating a boat thereon in phantom lines.

A central support or frame member 80 is positioned intermediate the length of the outer tube 22 (FIGURE 3), and this includes a cross piece 82, having upward extensions 84. All of the tie-bars 30 and 72 pass underneath this central bracing element which is provided with a depending strip 86.

This provides a very sturdy, but relatively light, framework, comprising the boat trailer, and a combination receptacle and support for the bow of the boat is mounted on the cylindrical element 32, this being in the shape of a combination bar and angle iron 88 (FIGURE 2). Upright rods 90 (FIGURE 1) are fixed in the outer ends of the cross frame element 16 to serve as guides when the boat is being floated onto the trailer. These are useful in the event that the water is muddy or roiled, making it difficult to see the submerged trailer wheels and frame.

A retractable dolly-wheel 92 is mounted on the underface of the cylindrical forward support 32, this being used whenever an additional support is considered desirable or necessary for the trailer, either on land or in the water.

Any suitable connection, such as an ordinary ball and socket joint 94, can be employed at the forward end of the telescopic tube 44, and this end is also provided with an air inlet controlled by a manually operated valve 96, whereby the flow of air into or out of the telescopic sections can be controlled. The usual legally necessary safety chain connection is provided, as shown at 98 in FIGURE 2.

In operation, the boat 12, having been placed on the trailer, is conveyed to a launching site, the boat at that time being in a position with respect to the tow car, as indicated in the dash lines in FIGURE 1. The towing vehicle is backed across the beach until such time as the trailer wheels 14 are almost in the water, and the beach will inevitably slope downwardly, as shown in FIGURE 1.

By opening the air valve 96, and possibly with some slight push on the boat or trailer, the trailer and boat are allowed to move out in the water to the extent shown in the full lines in FIGURE 1, at which time the boat will usually float and can readily be moved away from the trailer. The tow car, with the trailer and tow bar in extended position, can then be pulled away from the water, and the trailer can then be moved up into close proximity with the tow car, as shown in FIGURE 2, or the extended relationship may simply be maintained until such time as the user desires to remove the boat from the water, when it is simply again floated onto the trailer and pulled out. For towing over a highway or road, the tow bar is telescoped in an obvious manner.

It will be evident that herein is provided a simple, yet very effective means for launching a small boat and also for removing it from the water with a minimum expenditure of time, trouble and manual labor, while, at the same time, a maximum of safety in all operations of towing and launching is assured. The apparatus is economical of construction, can be readily detached from the towing vehicle when not in use and the manually controlled air inlet eliminates danger of too fast a launching movement, even on steep banks. Furthermore, the resilient means supplement the air cushion so that ease and safety of operation is always assured.

We are aware than many changes may be made and numerous details of construction varied throughout a wide range without departing from the principles of this invention; and we, therefore, do not propose limiting the patent granted hereon otherwise than as necessitated by the prior art.

We claim as our invention:

1. A telescopic tow bar for boat trailers comprising hollow sections arranged to slide one within the other, the outer section forming part of the trailer, manually controlled means for regulating the relative movement of the hollow sections and means for locking the sections in both telescoped and extended relationship, said locking means comprising a bar elliptical in cross section adapted to be fitted into aligned openings in the hollow sections.

2. A telescopic tow-bar and launching means for boats, comprising a plurality of hollow tubular sections aligned to slide one within the other, means at one end of the forward and smaller section for connecting the same to a towing vehicle, the largest section forming part of the trailer, means for locking all the sections in both telescoped and extended relationship, cushioning and sealing elements at the forward end of each larger section, said means including laterally expansible annuli and a resilient disk.

3. A device as described in claim 2, wherein the disk has a restricted air passage therethrough and wherein manually controlled means are provided for cushioning the relative movements of the tubular sections.

References Cited in the file of this patent
UNITED STATES PATENTS

| | | |
|---|---|---|
| 2,361,951 | Livermon | Nov. 7, 1944 |
| 2,451,698 | Swinehart | Oct. 19, 1948 |
| 2,591,312 | Stees | Apr. 1, 1952 |
| 2,665,902 | Allen | Jan. 12, 1954 |
| 2,765,942 | Niemeier | Oct. 9, 1956 |
| 2,799,416 | Balko et al. | July 16, 1957 |
| 2,810,589 | Tarleton | Oct. 22, 1957 |
| 2,856,087 | Steber | Oct. 14, 1958 |